United States Patent [19]

Mitchell, Jr. et al.

[11] 4,155,117
[45] May 15, 1979

[54] SYNCHRONIZING CHANNEL-TO-CHANNEL ADAPTER

[75] Inventors: Matthew J. Mitchell, Jr., Endicott; Howard L. Page, Apalachin, both of N.Y.

[73] Assignee: International Business Machines Corporation, Armonk, N.Y.

[21] Appl. No.: 819,913

[22] Filed: Jul. 28, 1977

[51] Int. Cl.[2] .............................................. G06F 3/04
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,372,378 | 3/1968 | Devore et al. | 364/200 |
| 3,400,372 | 9/1968 | Beausoleil | 364/200 |
| 3,581,286 | 5/1971 | Beausoleil | 364/200 |
| 3,601,807 | 8/1971 | Beausoleil et al. | 340/166 |
| 3,634,830 | 1/1972 | Baskin | 364/200 |
| 3,725,864 | 4/1973 | Clark et al. | 364/200 |
| 3,753,234 | 8/1973 | Gilbert et al. | 364/200 |
| 3,916,380 | 10/1975 | Fletcher et al. | 364/200 X |
| 3,984,819 | 10/1976 | Anderson | 364/200 |
| 3,988,716 | 10/1976 | Fletcher et al. | 364/200 |
| 4,014,005 | 3/1977 | Fox et al. | 364/200 |

OTHER PUBLICATIONS

Cormier et al., "Channel-to-Channel Adapter for I/O Interface Switching", IBM TDB vol. 13, No. 10, Mar. 1971, pp. 2951-2952.
"IBM System/360 Special Feature Channel-to-Channel Adapter", IBM Systems Reference Library, Feb. 1966.
"IBM System/370 Special Feature Description: Channel-to-Channel Adapter", IBM Systems, Mar. 1972.
Lavington et al., "The MUS Multicomputer Communication System", IEEE Transactions on Computers, vol. C-26, No. 1, Jan. 1977, pp. 19-28.

*Primary Examiner*—Gareth D. Shaw
*Assistant Examiner*—Thomas M. Heckler
*Attorney, Agent, or Firm*—Richard E. Bee; Saul A. Seinberg

[57] ABSTRACT

A high performance channel-to-channel adapter for interconnecting two or more digital computers or digital data processors. Multiple input/output device addresses are recognized by the channel-to-channel adapter. The channel-to-channel adapter makes the proper processor-to-processor connection by matching device addresses. In particular, it interconnects for data transfer purposes the two processors for which the same device address has been received. The assignment of device addresses for processor use and the direction of data transfer are by conventions agreed to among the software systems executing on the interconnected processors. The channel-to-channel adapter does not have a view of these conventions. In the more general case, two device addresses are assigned by software convention to each processor-to-processor link, one address being used to transfer data in one direction and the other address being used to transfer data in the opposite direction.

12 Claims, 13 Drawing Figures

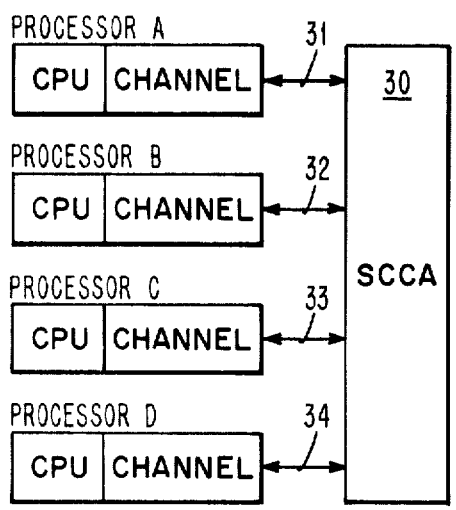

FIG. 3

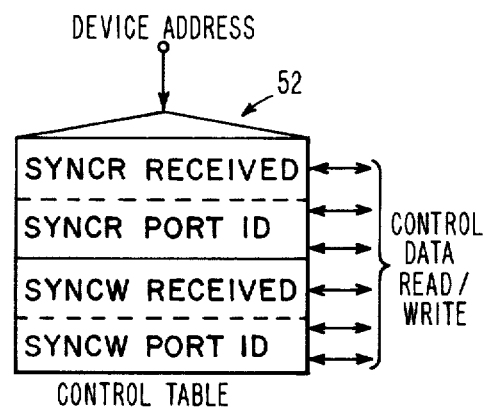

| LINK | TRANSFER | DEVICE ADDRESS |
|---|---|---|
| AB | A → B<br>A ← B | 01<br>02 |
| AC | A → C<br>A ← C | 03<br>04 |
| AD | A → D<br>A ← D | 05<br>06 |
| BC | B → C<br>B ← C | 07<br>08 |
| BD | B → D<br>B ← D | 09<br>0A |
| CD | C → D<br>C ← D | 0B<br>0C |

FIG. 5

| PROGRAM APPLICATION | TRANSFER | DEVICE ADDRESS |
|---|---|---|
| AB-1 | A → B<br>A ← B | 01<br>02 |
| AB-2 | A → B<br>A ← B | 03<br>04 |
| ABCD-1 | A → B<br>A ← B | 05<br>06 |
| AC-1 | A → C<br>A ← C | 21<br>22 |
| AC-2 | A → C<br>A ← C | 23<br>24 |
| ABCD-1 | A → C<br>A ← C | 25<br>26 |
| AD-1 | A → D<br>A ← D | 41<br>42 |
| ABCD-1 | A → D<br>A ← D | 43<br>44 |
| BC-1 | B → C<br>B ← C | 61<br>62 |
| ABCD-1 | B → C<br>B ← C | 63<br>64 |
| BD-1 | B → D<br>B ← D | 81<br>82 |
| ABCD-1 | B → D<br>B ← D | 83<br>84 |
| ABCD-1 | C → D<br>C ← D | A0<br>A1 |

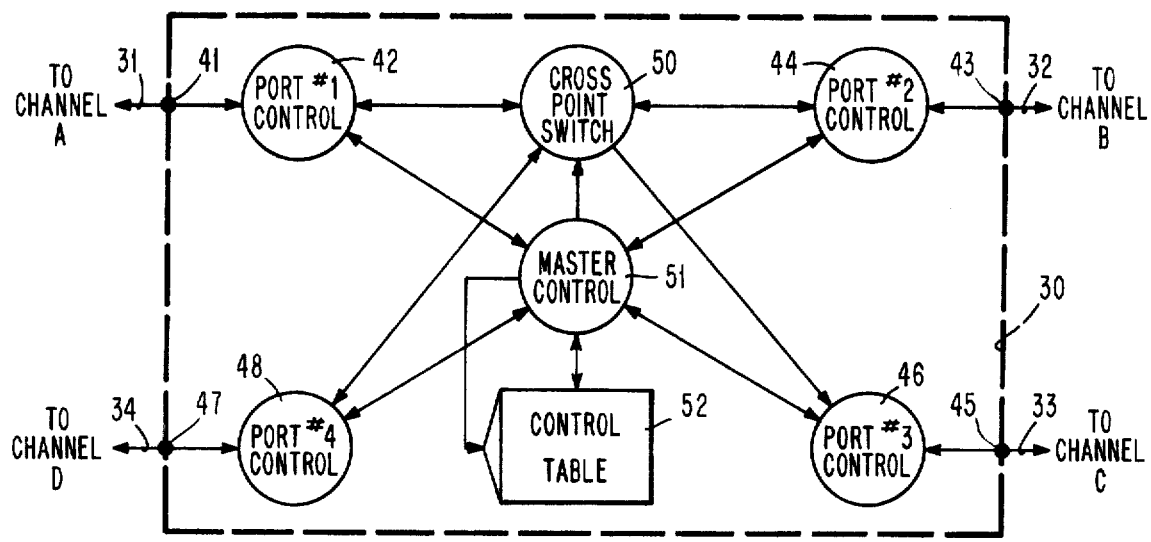
FIG. 6
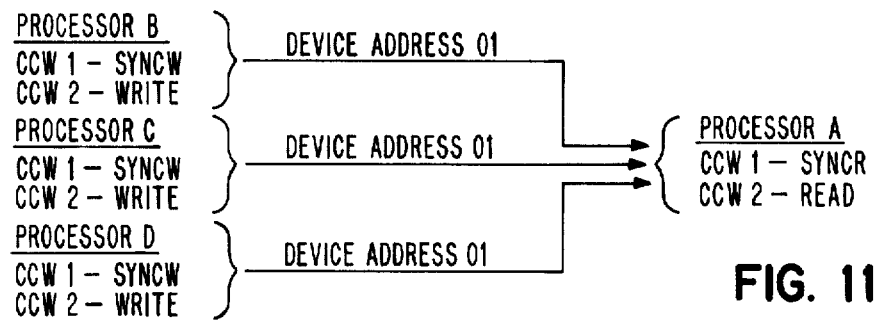
FIG. 11
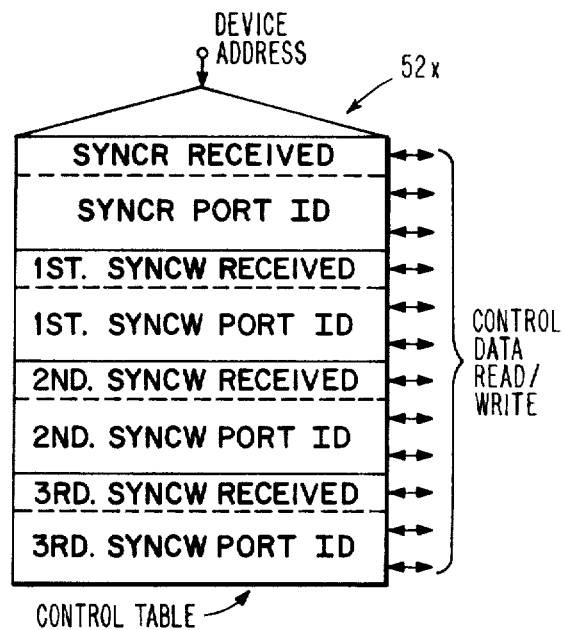
FIG. 12
FIG. 13

SYNCHRONIZING CHANNEL-TO-CHANNEL ADAPTER

REFERENCES

The following references provide useful background information for the present invention:

(1) IBM Technical Manual entitled "IBM System/360 Special Feature: Channel-to-Channel Adapter," dated February 1966, IBM Order Number GA22-6892;

(2) U.S. Pat. No. 3,400,372 granted to William F. Beausoleil et al on Sept. 3, 1968 and entitled "Terminal for a Multi-Data Processing System";

(3) IBM Technical Manual entitled "IBM System/370 Special Feature Description: Channel-to-Channel Adapter", First Edition dated March 1972, IBM Order Number GA22-6983;

(4) Technical article by R. Cormier et al entitled "Channel-to-Channel Adapter for I/O Interface Switching" and appearing at pages 2951 and 2952 of the March 1971 issue of the IBM Technical Disclosure Bulletin;

(5) U.S. Pat. No. 3,735,365 granted to Hideo Nakamura et al on May 22, 1973 and entitled "Data Exchange System";

(6) U.S. Pat. No. 3,753,234 granted to Edward O. Gilbert et al on Aug. 14, 1973 and entitled "Multicomputer System with Simultaneous Data Interchange Between Computers";

(7) U.S. Pat. No. 3,984,819 granted to George A. Anderson on Oct. 5, 1976 and entitled "Data Processing Interconnection Techniques";

(8) U.S. Pat. No. 3,988,716 granted to James C. Fletcher et al on Oct. 26, 1976 and entitled "Computer Interface System";

(9) Technical article by Simon H. Lavington et al entitled "The MU5 Multicomputer Communication System" and appearing at pages 19–28 of the January 1977 issue of the IEEE Transactions on Computers;

(10) U.S. Pat. No. 3,372,378 granted to Ernest W. Devore et al on Mar. 5, 1968 and entitled "Input/Output Unit Switch";

(11) U.S. Pat. No. 3,581,286 granted to William F. Beausoleil on May 25, 1971 and entitled "Module Switching Apparatus with Status Sensing and Dynamic Sharing of Modules";

(12) U.S. Pat. No. 3,601,807 granted to William F. Beausoleil et al on Aug. 24, 1971 and entitled "Centralized Crosspoint Switching Unit";

(13) U.S. Pat. No. 3,725,864 granted to William A. Clark et al on Apr. 3, 1973 and entitled "Input/Output Control";

(14) U.S. Pat. No. 3,336,582 granted to William F. Beausoleil et al on Aug. 15, 1967 and entitled "Interlocked Communication System";

(15) IBM Technical Manual entitled "System/360 I/O Interface Introduction", Sixth Edition dated August 1970, IBM Order Number SR25-5202;

(16) U.S. Pat. No. 3,582,906 granted to William F. Beausoleil et al on June 1, 1971 and entitled "High-Speed DC Interlocked Communication System Interface";

(17) IBM Technical Manual entitled "IBM System/360 and System/370 I/O Interface Channel to Control Unit Original Equipment Manufacturers' Information", Fourth Edition dated January 1976, IBM Order Number GA22-6974; and

(18) IBM Technical Manual entitled "2880 Block Multiplexer Channel", Fifth Edition dated February 1976, IBM Order Number SY27-2305.

The above-referenced IBM technical manuals and IBM Technical Disclosure Bulletin are published by International Business Machines Corporation of Armonk, N.Y.

No representation is made or intended that the foregoing references are the only references relating to the present subject matter.

BACKGROUND OF THE INVENTION

This invention relates to electronic interface mechanisms and electronic switching mechanisms for enabling two or more digital computers or digital data processors to communicate with one another.

As may be seen from the above-cited references, various mechanisms and systems have been heretofore proposed for enabling one data processor to communicate with another data processor. A mechanism currently marketed by International Business Machines Corporation of Armonk, N.Y. (herein referred to as "IBM") for accomplishing this purpose is called a "channel-to-channel adapter" and is described in References (1)–(3). This adapter is connected to the input/output (I/O) interface cables associated with two different data processor input/output channels for enabling data transfer operations to take place between these two channels. Normally, the adapter is used to connect channels associated with two different data processors, thus establishing a loosely coupled multiprocessing system. To each of the channels to which the adapter is connected, the adapter appears to be an I/O device control unit and the adapter is selected and responds in the same manner as an I/O device control unit.

While the currently marketed IBM channel-to-channel adapter performs its intended purpose in a satisfactory manner, there is nevertheless room for further improvements. For one thing, there is room for increasing the efficiency of the processor-to-processor data transfer operations. For another thing, there is room for reducing the processor software overhead required for the data transfer operations. For a further thing, there is room for reducing the amount of channel busy time caused by the adapter. And with respect to a newly emerging class of processor applications commonly referred to decentralized or distributed data processing systems, there is a need for providing a channel-to-channel adapter capable of enabling communications between more than two data processors.

Other more or less representative and heretofore proposed mechanisms and systems for interconnecting two or more data processors are described in References (4)–(9). These proposed mechanisms and systems have various limitations which are not always desirable. Some are relatively slow, some are relatively complex and expensive and some are of a relatively specialized nature which is not compatible for use with many of the data processors currently in use, at least not without the use of further special adapters for coupling the data processors to the interface or switching mechanism.

A further class of somewhat related items is represented by References (10)–(13). These references describe various crosspoint type switching mechanisms for enabling a plurality of data processor I/O channels to be switched between different ones of a plurality of I/O control units or I/O devices or, as represented by Reference (10), for enabling a plurality of control units to be switched between different ones of a plurality of input/output devices. While some aspects of these mechanisms may be used in connection with the present invention, these references do not directly concern themselves with the problems involved in establishing data transfer interconnections between two or more data processors.

A further class of systems which are used for enabling different data processors to communicate with one another are known as "teleprocessing systems". These systems use communication facilities, such as telephone lines and radio links, for providing the connections between the different computers or data processors. These systems employ relatively complex transmission control units and communications controllers for interfacing with the particular communications network being used. Also, an appreciable amount of access method software is required in each data processor which is to be connected to the system. As a consequence, these teleprocessing systems are too slow and too expensive for present purposes. By way of contrast, what is contemplated by the present invention is a relatively inexpensive channel-to-channel adapter unit which may be directly connected to two or more data processors by way of their normal I/O interface cables for enabling high speed communications between such processors.

SUMMARY OF THE INVENTION

It is an object of the present invention to provide a new and improved channel-to-channel adapter for speeding up processor-to-processor data transfer operations and reducing the amount of software overhead associated therewith.

It is another object of the invention to provide a new and improved channel-to-channel adapter wherein the channel busy time is reduced.

It is a further object of the invention to provide a new and improved channel-to-channel adapter for interconnecting two or more data processors for enabling high-speed communications therebetween.

It is an additional object of the invention to provide a new and improved and relatively inexpensive multiple processor channel-to-channel adapter which is compatible with and may be directly connected to the input/output interface cables employed by a relatively large number of data processors currently in use.

It is another object of the invention to provide a new and improved multiple processor channel-to-channel adapter wherein contention cases are handled without software rescheduling in the processors involved in such cases.

In accordance with the invention, a channel-to-channel adapter for interconnecting data processors comprises a plurality of ports each of which is adapted to be coupled to an input/output channel of a different one of a plurality of data processors. The adapter also includes data transfer circuitry for selectively providing different data transfer interconnections between the ports. The adapter further includes a plurality of port control mechanisms individually coupled to the different ones of the ports and each including circuitry for detecting the receipt of any one of a plurality of predetermined input/output device addresses. The adapter further includes control circuitry coupled to the port control mechanisms and responsive to the predetermined device addresses received at the ports for enabling the data transfer circuitry to provide a data transfer interconnection following receipt of a predetermined device address at two of the ports and to provide other data transfer interconnections following receipt of other predetermined device addresses at two of the ports.

For a better understanding of the present invention together with other and further objects and features thereof, reference is made to the accompanying description taken in connection with the accompanying drawings, the scope of the invention being pointed out in the appended claims.

BRIEF DESCRIPTION OF THE DRAWINGS

Referring to the drawings:

FIG. 3 shows in a high level manner a second embodiment of the invention for interconnecting four data processors;

FIGS. 4 and 5 are charts used in explaining different modes of operation for the SCCA of FIG. 3;

FIG. 6 shows in an intermediate level manner the internal construction of the SCCA of FIG. 3;

FIG. 7 shows in greater detail the nature of the control table of FIG. 6;

FIGS. 11 and 12 are charts used in explaining a further possible mode of operation for the SCCA of FIG. 6; and FIG. 13 shows a modified form of control table for use in connection with the mode of operation represented in FIGS. 11 and 12.

DESCRIPTION OF THE TWO-PROCESSOR EMBODIMENT

Figure 1:
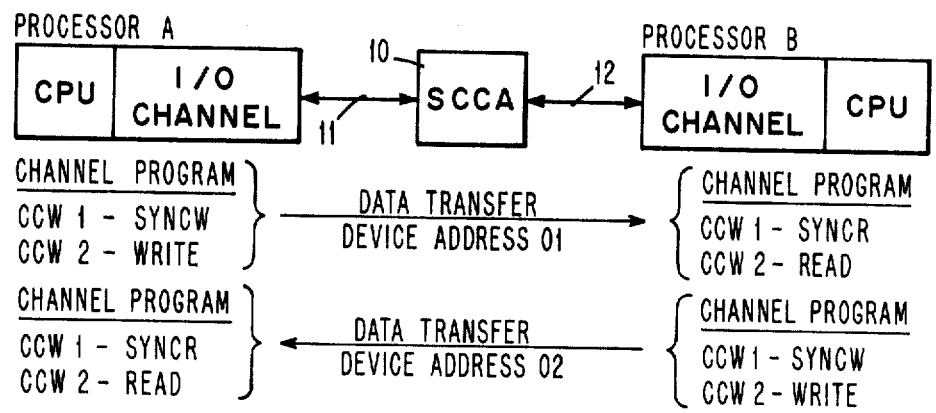
FIG. 1 shows in a high level manner a first embodiment of the invention for interconnecting two data processors.

Referring to FIG. 1, there is shown a synchronizing channel-to-channel adapter (SCCA) 10 for interconnecting a pair of large-scale digital computers or data processors identified as processor A and processor B. Before discussing the new SCCA 10, it is helpful to briefly review the operation of the present System/370 channel-to-channel adapter currently marketed by IBM, References (1)–(3). This present System/370 channel-to-channel adapter provides a data transfer path between two data processors, say, for example, processor 1 and processor 2. This adapter takes up one position on a System/370 channel of processor 1 and it takes up one position on a System/370 channel of processor 2. Data moves between the processors when a WRITE command is issued by the processor on one side of the adapter and a READ command is issued by the processor on the other side. The direction of data transfer is determined by which processor issues the WRITE command and which processor issues the READ command, the data moving from the WRITE processor to the READ processor.

Assume that processor 1 wants to send a message to processor 2. Processor 1 will issue a control command that is accepted and retained by the present System/370 adapter. Processor 1 disconnects and continues with normal processing. Receipt of the control command at the adapter forces an ATTENTION interruption to processor 2. Processor 2 will now issue a SENSE command to the adapter to retrieve the pending control command information. This information might be used to determine whether a complementing READ or WRITE command should be issued. Accordingly, processor 2 issues the proper complementing command. Receipt of the SENSE command at the adapter causes a further action: The adapter will force a DEVICE END status to processor 1, which will cause a command chain to a WRITE command. Finally, when the WRITE command from processor 1 and the READ command from processor 2 are detected at the adapter, the data transfer takes place.

By way of comparison, the new SCCA 10 allows processor-to-processor communication without the present System/370 adapter overhead of ATTENTION interruptions and subsequent SENSE commands. In other words, the new SCCA 10 eliminates the use of these items and the currently required steps associated therewith. In addition, the new SCCA 10 minimizes the channel busy time by synchronizing the channels such that data transfer commands (READ and WRITE commands) are activated only when both processors are actually prepared to transfer data. Another problem with the existing System/370 adapter occurs when both processors issue commands that are noncomplementing. In this case, one of the commands is rejected to its processor and the proper complementing command then scheduled by such processor. This rescheduling problem is avoided with the new SCCA 10.

As indicated in FIG. 1, each of processors A and B includes a central processing unit (CPU) and an input-/output (I/O) channel. (In the usual case, most processors include several I/O channels, but only one of these need be considered for present purposes.) The I/O channel of processor A is connected to a first port of SCCA 10 by a multiconductor I/O interface cable 11. In a similar manner, the I/O channel of processor B is connected to a second port of SCCA 10 by a multiconductor I/O interface cable 12. Each of cables 11 and 12 may also be connected to various I/O control units (not shown) which are, in turn, connected to various I/O devices (not shown). For sake of example herein, each of processors A and B is assumed to be of the IBM System/370 type and each of the interface cables 11 and 12 is assumed to be of the IBM System 360/370 type described in References (14)–(17). A limitation that should be noted is that the I/O channels to which the SCCA 10 is connected should be of the so-called "block multiplexer" type in the sense that they should have the ability to disconnect themselves from the SCCA 10 or any other control unit connected to their interface cable between the occurrence of CHANNEL END (CE) and DEVICE END (DE) for any given channel command word (CCW). The construction and operation of a representative IBM Block Multiplexer Channel is described in Reference (18).

The reference herein to IBM System/360 or System/370 equipment or components should be taken by way of example only and not by way of limitation on the scope of the present invention.

The SCCA 10 is provided with a multiple device address recognition capability. In other words, SCCA 10 is constructed to recognize and accept up to 256 different I/O device addresses. Each of processors A and B will use these same device addresses for purposes of communicating with the SCCA 10. These device addresses are selected in advance and reserved for communication with the SCCA 10. Furthermore, both of processors A and B will agree by program convention that certain ones of these SCCA device addresses imply data transfer from processor A to processor B and other of these device addresses infer data transfer from processor B to processor A. As indicated in FIG. 1, two device addresses are required for symmetrical or bidirectional operation between the two processors. For the FIG. 1 example, device address 01 will be used only for data transfer from processor A to processor B. Conversely, device address 02 will be used only for data transfer from processor B to processor A.

The present embodiment further employs two new channel commands that are used for purposes of communicating with the SCCA 10. Each of these new commands is a synchronizing command which is used to synchronize the operation of the SCCA 10 with the operation of the data processors. One of these new commands is a "sync for write" (SYNCW) command which should precede and be command chained to a WRITE type data transfer channel command. The other of the new commands is a "sync for read" (SYNCR) command which should precede and be command chained to a READ type data transfer channel command.

FIG. 1 shows a typical usage of these synchronizing commands. In particular, processor A includes a first channel program for device address 01 and a second channel program for device address 02. The 01 channel program includes a first channel command word (CCW-1) which contains a SYNCW command and is command chained to a second channel command word (CCW-2) which contains a WRITE command. The 02 channel program in processor A includes a first CCW which contains a SYNCR command and a second CCW which is command chained thereto and includes a READ command. In a similar manner, processor B includes a first channel program for device address 01 and a second channel program for device address 02. In this case, however, the 01 program includes a SYNCR CCW command chained to a READ command CCW, while the 02 program includes a SYNCW CCW command chained to a WRITE CCW.

If necessary to accommodate the data to be transferred, each of the address 01 programs in FIG. 1 may have additional WRITE and READ CCW's which may be either command chained or data chained to the respective ones of the CCW-2 WRITE and READ CCW's. This same consideration applies to the address 02 channel programs.

To each of processors A and B, the SCCA 10 appears to be just another I/O control unit. The handshaking sequences used for this purpose are described in detail in References (14)–(18) and hence will not be repeated herein. Suffice it to say that each processor commences an input/output operation for a particular device address by commencing the customary initial selection sequence for the first CCW in the channel program for such device address. As the first step in such initial selection sequence, the processor sends out on its interface cable the particular device address in which it is interested. The control unit (or SCCA 10) which recognizes this device address then commits or interlocks the processor channel to it alone and notifies the processor of its acceptance to the device address. The processor then sends out the channel command contained in the first CCW to the interlocked control unit (or SCCA 10), after receipt of which the control unit (or SCCA 10) returns a status message to the processor.

For communicating with the SCCA 10, the first channel command issued by a given processor will be either the SYNCW or the SYNCR command. However, as far as its operation is concerned, the processor issuing same does not really know the difference. It merely issues the channel command in the first CCW in its customary manner.

When the SCCA 10 detects a sync command (either SYNCW or SYNCR), it will first determine whether a complementary sync command is pending for this same device address from the other channel side. Assume that the answer is negative. In this case, the SCCA 10 will return a CHANNEL END indication in its initial selection status message and signal the processor issuing the sync command to disconnect itself from the SCCA 10. At the same time, SCCA 10 records the device address and processor side to which it owes a DEVICE END status message. In response to the CHANNEL END status and the disconnect signal, the processor receiving same temporarily suspends the channel program in question, the I/O channel goes "not busy" and the processor instruction stream proceeds with other tasks. This disconnection and suspending of the channel program is performed in the customary manner for a block multiplexer channel (Reference (18)) which, as mentioned, is the kind of channel to which the SCCA 10 is connected. The SCCA 10 will return to the processor with the suspended channel program, the DEVICE END status to cause reactivation of the suspended channel program only at such time as a complementary sync command is subsequently issued to the same device address from the other channel side of the SCCA 10.

When the SCCA 10 detects a sync command and a sync command for this same device address has been received from the other channel side and is pending in the SCCA 10, the SCCA 10 returns both a CHANNEL END indication and a DEVICE END indication in its initial selection status message to the processor issuing the newly arrived sync command. The DEVICE END indication causes such processor to retain the channel connection to the SCCA 10. At the same time, the DEVICE END status owed to the processor that issued the earlier sync command is sent to such processor to reactivate the suspended channel program therein. The sending of the DEVICE END status to the two processors causes each processor to command chain to the second CCW in its respective channel program for this device address. As a consequence, each processor thereupon issues the channel command contained in its second CCW. Assuming that these next two channel commands are the proper complementing READ and WRITE commands, execution of these commands is immediately commenced without any further software overhead and the transfer of data takes place. For this data transfer phase of the operation, the SCCA 10 operates in substantially the same manner as does the present System/370 channel-to-channel adapter currently marketed by IBM (References (1)–(3)).

Some thought will show that for the two-processor embodiment of FIG. 1, the same result as discussed above can be accomplished by using only a single new sync command (SYNC) in place of each of the SYNCW and SYNCR commands. In other words, the temporary suspension of the channel programs can be accomplished without the processors or the SCCA 10 knowing in advance what kind of data transfer command is command chained to the sync command. As will be seen, however, the use of the two distinguishable sync commands (SYNCR and SYNCW) provides certain flexibility in the operation of the multiple processor embodiment to be described hereinafter. Thus, for sake of uniformity and for showing that the two distinguishable sync commands can provide a system which is valid for both cases, the distinguishable SYNCR and SYNCW commands are also described in conjunction with the FIG. 1 embodiment.

Figure 2:
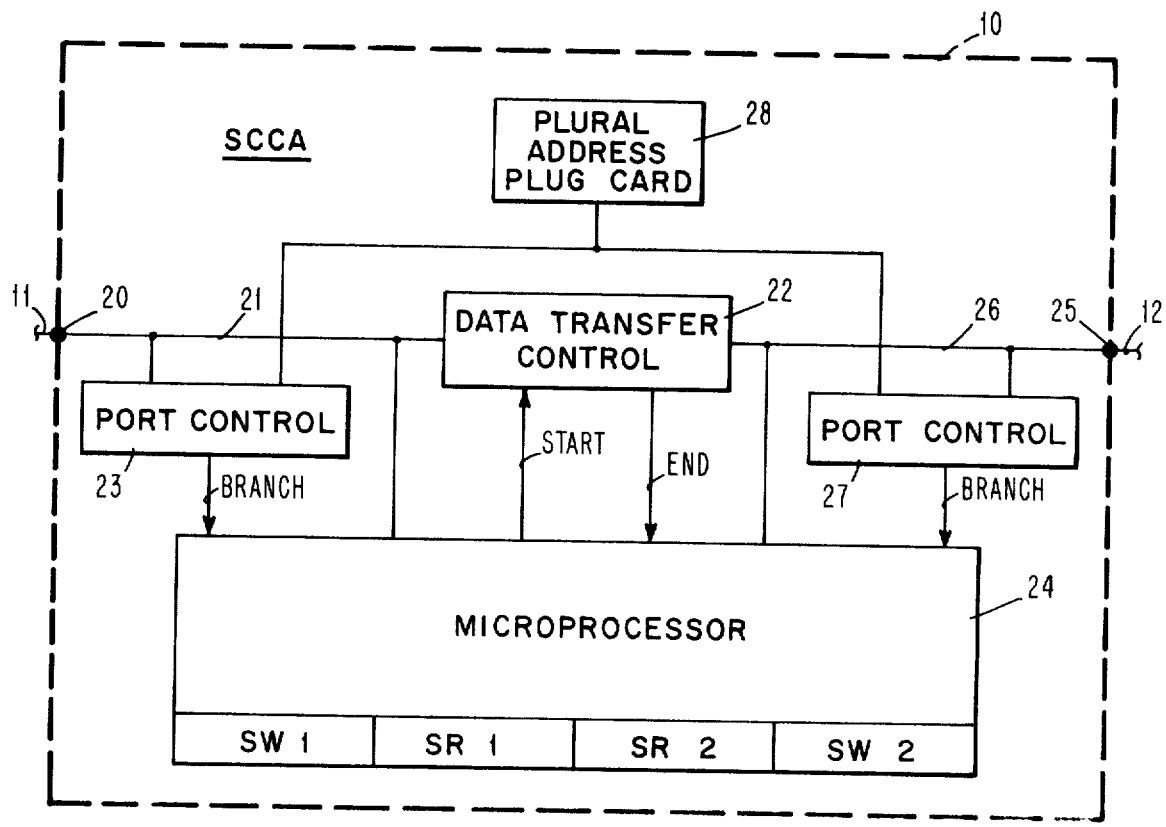
FIG. 2 shows in greater detail the internal construction of the synchronizing channel-to-channel adapter (SCCA) of FIG. 1.

Referring now to FIG. 2, there is shown in greater detail the internal construction of the two-processor SCCA 10. As there seen, the multiconductor interface cable 11 is connected by way of a first port 20 and an internal multiconductor bus 21 to each of a data transfer control unit 22, a port control unit 23 and a microprocessor 24. In a similar fashion, the second interface cable 12 is connected by way of a second port 25 and a second internal multiconductor bus 26 to each of the data transfer control unit 22, the microprocessor 24 and a second port control unit 27. A plural address plug card 28 is connected to each of the port control units 23 and 27 for supplying thereto an address indication or indications defining the I/O device addresses which are valid for purposes of communicating with the SCCA 10 or, in other words, the predetermined device addresses which are to be recognized by the SCCA 10. The pluggable nature of the plug card 28 enables the valid SCCA addresses to be changed to accommodate the particular processor I/O device requirements for the particular processor systems to which the SCCA is connected.

Four individual signal storage elements in the microprocessor 24 are reserved for purposes of storing indications of the predetermined or valid SCCA device addresses received by the ports 20 and 25. These storage elements are identified as SW-1, SR-1, SW-2 and SR-2 and may take the form of latches, register positions, memory locations or the like, depending on the particular microprocessor being used. In the simplest case, each of these storage elements is a one-bit storage element which is placed in a set condition when an indication of the occurrence of a particular sync command for a particular device address is to be recorded. Thus, for example, the SW-1 storage element is placed in a set condition when the occurrence of the SYNCW command for address 01 is to be recorded. Such setting indicates that address 01 has been received by one of the ports and that the channel command accompanying this address was a SYNCW command.

Each of the port control units 23 and 27 handles the initial portion of the initial selection sequence for the particular interface cable to which it is connected. Thus, for the interface cable 11, for example, the port control unit 23 examines the device address issued by processor A to determine whether it is one of the valid SCCA addresses permitted by the plug card 28. When a valid device address is detected by port control unit 23, such unit 23 activates the appropriate tag line of the interface cable 11 to interlock the processor A channel to the SCCA 10 exclusively, returns the detected device address to the processor A channel and sends a branch request message to the microprocessor 24. Microprocessor 24 then makes note of the device address and the ensuing channel command sent out on the interface cable 11. If neither of the microprocessor storage elements for this device address (e.g., storage elements SW-1 and SR-1) are in a set condition, then microprocessor 24 sets the appropriate one of these two storage elements to a set condition. In this case, the microprocessor 24 sends a CHANNEL END status message to the processor A.

If, on the other hand, the other storage element for this same device address is in a set condition, then the microprocessor 24 sends to the processor A a status message containing both a CHANNEL END and a DEVICE END indication. Concurrently therewith, it sends a status message with a DEVICE END indication to the other processor, processor B. Microprocessor 24 then signals the data transfer control unit 22 to prepare for data transfer operations. The actual transfer of data commences when the complementing READ and WRITE commands are received by the data transfer control unit 22. The data transfer control unit 22 thereafter operates in the same manner as the corresponding portion of the present System/370 channel-to-channel adapter to transfer data in a byte-by-byte manner from processor A to processor B or vice versa, depending on which processor issued the WRITE command and which processor issued the READ command.

After completion of the data transfer, the data transfer control unit 22 sends a DATA END signal to the microprocessor 24. Thereafter, the microprocessor 24 takes over and performs the ending sequence for the I/O operation. Also, it resets to zero the two storage elements for the device address used for the just-completed data transfer.

The normal mode of operation for SCCA 10 is a so-called "message sending" mode wherein the processors communicate by sending messages back and forth. Processor A will send a message to processor B, processor B will send a message back to processor A, etc. In this mode, each processor operates to place or return its READ address to a "synced for read" condition as soon as is practical. Thus, processor A will operate as soon as possible to issue a START I/O instruction for device address 02. This calls up the 02 channel program and causes an issuance of the SYNCR command. In response thereto, SCCA 10 will most likely return only a CHANNEL END status to temporarily suspend the 02 channel program in processor A. This places the 02 program in processor A in the desired "synced for read" condition. In the same manner, processor B will operate to issue a START I/O instruction for device address 01 as soon as possible. The objective is to maintain each device address in a "synced for read" condition at all times except when it is the address for a data transfer actually in progress. Thus, each device address is armed and ready to act in case the processor on the other side of the SCCA 10 should want to send a message. When a processor desires to send a message, it issues a START I/O instruction for its WRITE address. This calls up the channel program containing the SYNCW command and causes such command to be sent to the SCCA 10.

Considering now in greater detail the normal sequence of steps for the device address 01 for example, processor B will set up a pending channel program consisting of a SYNCR CCW which is command chained to a READ CCW. The READ CCW will specify the processor main storage location which will be used as the recipient storage area for the subsequent processor A to processor B data transfer. When the START I/O instruction is issued by processor B for this device address 01, the action of SCCA 10 is as previously described. In particular, the SYNCR command issued by processor B as a result of the START I/O instruction for device address 01 will be accepted by the SCCA 10. The SCCA 10 will then force a channel disconnect while returning the CHANNEL END status. The SCCA 10 will record in storage element SR-1 of microprocessor 24 an indication denoting SYNCR received from the processor B side for device address 01. The processor B channel will go "not busy" and the processor B instruction stream will proceed with other tasks. The processor B channel now contains a suspended channel program for device address 01.

So far, no action has been taken on the processor A side. Eventually, processor A will want to send a message to processor B. The channel program in processor A that will be used to move this message is, as indicated in FIG. 1, a SYNCW command CCW which is command chained to a WRITE command CCW. The data address field of the WRITE command CCW points to the processor A main storage location which contains the message to be sent. Processor A initiates the message sending action by issuing a START I/O instruction for device address 01. This calls up the 01 channel program just described. When the SCCA 10 receives the SYNCW command, the SCCA 10 action will be as described above for the case where a second SYNC command is received for the same device address. In particular, the SYNCW command will be accepted by the SCCA 10. The SCCA 10 will retain the connection to processor A by returning thereto both a CHANNEL END and a DEVICE END on initial selection. The SCCA 10 will also return the owed DEVICE END to processor B. Since the channels on both sides of SCCA 10 have now received DEVICE END and command chaining is indicated, the channels will command chain to their second CCW's and issue the complementing WRITE and READ commands. The desired data transfer from processor A to processor B then takes place.

In the above example, assume that the processor A to processor B message has just been sent, that processor B has not yet processed the message and that processor A wishes to send a new message. Now when processor A issues the new START I/O instruction to device address 01, the SCCA 10 will cause processor A to disconnect with a pending channel program. Processor A then proceeds with other tasks and its channel is now free. When processor B is finally ready to accept a new message, it will issue a new START I/O instruction for device address 01. The resulting processor B SYNCR command, when received at the SCCA 10, will cause the owed DEVICE END to be sent to processor A. Both channels will now command chain to the data transfer commands and the new message will be sent.

The foregoing operation is symmetrical for the second device address used for the SCCA 10 which, in the FIG. 1 example, is the 02 device address.

Since the SCCA 10 provides full synchronization, there is no abortive contention case where processor A and processor B both want to "write." With the present System/370 channel-to-channel adapter, on the other hand, one WRITE command would be rejected and the software operating system in that processor would instead issue the proper complementing READ command. The SCCA 10 avoids this case by allowing each channel program to proceed to the data transfer command only when the corresponding channel programs on both sides of the SCCA 10 are properly ready for such action, that is, only when the SYNCW and SYNCR commands have been received from the respective processors for the same device address.

With respect to this contention situation, assume, for example, that processor A has pending a SYNCR command (disconnected but command chained to a READ command) to device address 02, while processor B has pending a SYNCR command (disconnected but command chained to a READ command) to device address 01. Now consider the contention case where both of processors A and B are initiating a message transfer to the other processor at the same time. In this case, processor A is issuing a START I/O instruction for a SYNCW command to device address 01, while processor B is issuing a START I/O instruction for a SYNCW command to device address 02. The SCCA 10 will resolve the contention by committing to one of these device addresses, say address 01. In this event, the processor B SYNCW command to address 02 will nevertheless be accepted by the SCCA 10, CHANNEL END status and disconnection will be signaled to processor B and the SCCA 10 will record the contention case with the implication that a DEVICE END to address 02 is owed to both processor B and processor A. A record of the contention case is made by turning on or placing in a set condition the second storage element in the microprocessor 24 for the 02 device address which, in this case, is the storage element SW-2. Now the data transfer operation for device address 01 can proceed as previously explained for the normal case.

When the 01 channel program completes, the SCCA 10 will note that a previous contention case must now be handled (a device address exists, in this case, address 02, for which both of the storage elements, in this case, SR-2 and SW-2, are in a set condition). A status message containing a DEVICE END indication is then issued to both of processors A and B for device address 02. This reactivates the disconnected channel programs for device address 02 in the two processors, whereupon the data transfer for device address 02 will take place.

Description of the Multiple Processor Embodiment

Referring to FIG. 3 of the drawings, there is shown a further embodiment of the invention wherein a synchronizing channel-to-channel adapter is provided for interconnecting more than two data processors. In the example illustrated in FIG. 3, a synchronizing channel-to-channel adapter (SCCA) 30 is provided for interconnecting four different digital data processors, identified as processors A, B, C and D. SCCA 30 is coupled to processor A by way of its interface cable 31, to processor B by way of its interface cable 32, to processor C by way of its interface cable 33 and to processor D by way of its interface cable 34. For sake of example, each of the multiconductor I/O interface cables 31–34 is assumed to be of the IBM System/370 type (References (14)–(17)). Also, for the reasons previously indicated, the processor channels to which the SCCA 30 is coupled are assumed to be of the block multiplexer type.

FIG. 4 shows a representative list of I/O device address assignments that may be used by the four processors A, B, C and D for purposes of communicating with the SCCA 30. This particular set of address assignments provides a separate two-way processor-to-processor link for each of the processors A, B, C and D. The link AB for interconnecting processor A with processor B employs, for example, device addresses 01 and 02. In the same manner as indicated in FIG. 1, processor A of FIG. 3 includes a SYNCW+WRITE channel program for device address 01 and a SYNCR+READ channel program for device address 02. In a similar vein, processor B of FIG. 3 includes a SYNCR+READ channel program for device address 01 and a SYNCW+WRITE channel program for device address 02.

Similar channel program considerations apply for each of the other links AC, AD, etc. Thus, for purposes of communicating with SCCA 30 in the manner depicted in FIG. 4, processor A includes a total of six different channel programs, one for each of device addresses 01–06. The 01, 03 and 05 programs are SYNCW+WRITE programs and the 02, 04 and 06 programs are SYNCR+READ programs. Processors B, C and D likewise include a total of six different channel programs for communicating with SCCA 30 as shown in FIG. 4.

For the FIG. 4 mode of operation, each device address identifies two factors:

(1) The two processors to be linked; and
(2) The direction of data transfer.

The device address assignments of FIG. 4, which are only examples, are chosen in advance and are specified for the corresponding channel programs before they are loaded into their respective ones of processors A, B, C and D. The SCCA 30 is constructed to recognize and handle the complete set of twelve device addresses indicated in FIG. 4. SCCA 30, however, does not have a view of the address conventions agreed to among the channel programs. Instead, the primary function of SCCA 30 is that of connecting at the proper time the two channels that issue commands to the same device address.

For any given device address, the operation of the SCCA 30 is the same as previously described in the FIG. 1 embodiment. The only additional action required on the part of the SCCA 30 is that, in addition to recording the occurrence of a particular valid SCCA device address, the SCCA 30 must also record the identity of the SCCA port at which such device address was received. When the second sync command to the same device address is received, SCCA 30 consults this record and connects the port through which the second command was received to the port identified by the record for the first sync command. In other words, SCCA 30 matches device addresses and interconnects for data transfer purposes the two processors from which the same device address has been received. In this manner, any two processors are enabled to communicate with each other.

Multiple data processors connected via the SCCA 30 will derive all of the benefits previously claimed for the two-processor embodiment of FIG. 1. In particular, ATTENTION interruptions are not required. Also, a SENSE command is not required. Furthermore, channel busy time is somewhat reduced since the data transfer commands are not entered until two processors have dispatched a START I/O instruction to the same device address. Finally, the contention case is handled without software rescheduling.

Referring now to FIG. 5, there is shown an example of a more elaborate set of device address assignments that may, when desired, be employed for the multiple processor embodiment of FIG. 3. As indicated in FIG. 5, multiple sets of links can be provided for some or all of the processor pairs. For the pair formed by, for example, processor A and processor B, six device addresses provide three sets of links, namely, AB-1, AB-2 and ABCD-1. As indicated by the heading of the left-hand column in FIG. 5, these different links between processors A and B are assigned to different program applications. Thus, the first set of links provided by device addresses 01 and 02 enables part of a first application program located in processor A to communicate directly with part of this same program application located in processor B, and vice versa. In a similar manner, the second set of links provided by device addresses 03 and 04 enables a second program application in processor A to communicate directly with the corresponding part of this same program application in processor B, and vice versa.

The ABCD-1 program application represents a program application wherein parts of the program application are located in each of the processors A, B, C and D and wherein it is desired that the part in any given processor be able to communicate directly with the part in any other processor. For some ABCD type program applications, one or more of the processor-to-processor links may be omitted. Also, as a further possibility, some program applications may be implemented which make use of only three of the processors and not all four of them.

Since each System/370 I/O channel uses an eight-bit device address, there are up to 256 different device addresses that can be used in connection with the SCCA 30. Assuming that no control units or I/O devices other than the SCCA 30 are connected to the I/O interface cable from each processor, a total of 128 different two-processor program applications can be accommodated, with these program applications being divided up among the different processor pairs in any desired manner excepting that, in general, at least one link should be provided for each processor pair. For the immediate future at least, this relatively large number of possibilities should be more than adequate to handle the requirements of most customers.

Note that in the FIG. 5 case, each device address identifies three factors:
 (1) The two processors to be linked;
 (2) The direction of data transfer; and
 (3) The program application.

The particular relationships for each device address are established by the program conventions agreed to for the programs in the different processors. The SCCA 30 is completely unaware of and does not need to know these relationships. The primary function of the SCCA 30 is simply to compare device addresses and to interconnect the two SCCA ports at which the same device address is received.

Referring now to FIG. 6 of the drawings, there is shown in greater detail the internal construction of the SCCA 30 of FIG. 3. As indicated in FIG. 6, the processor A interface cable 31 is coupled by way of a first port 41 to a first port control unit 42, the processor B interface cable 32 is connected by way of a second port 43 to a second port control unit 44, the processor C interface cable 33 is connected by way of a third port 45 to a third port control unit 46 and the processor D interface cable 34 is connected by way of a fourth port 47 to a fourth port control unit 48. Each of the port control units 42, 44, 46 and 48 is connected by way of a multiconductor bus to a crosspoint switch unit 50. Each of port control units 42, 44, 46 and 48 is also connected by way of a multiconductor bus to a master control unit 51.

Associated with the master control unit 51 is a storage mechanism 52 having a different storage location for each of the predetermined or valid SCCA device addresses for storing various indications relating to the receipt of these device addresses by the port units 42, 44, 46 and 48. The storage mechanism 52, which may be part of a larger storage mechanism, will be herein referred to as the "control table". As such, it is addressed by addresses supplied by the master control 51 and stores control type information received from the master control 51 and, when needed, reads out the stored information and sends it back to the master control 51. This control table storage mechanism 52 is shown in greater detail in FIG. 7.

To each of processors A, B, C and D, the SCCA 30 appears to be an ordinary sort of I/O control unit and each processor talks to the SCCA 30 by means of the customary I/O interface handshaking protocol described in References (14)–(17). Thus, for the initial selection sequence for processor A, for example, processor A sends out one of the valid device addresses that is recognizable by the SCCA 30. This device address is fielded by the port 1 control 42 which then sends this same device address back to the processor A to verify that it has been received and accepted. Processor A then sends out the channel command for the first CCW for this device address and, upon receipt of same, the port 1 control unit 42 sends back a status message. This, in its general aspects, is nothing more than the customary I/O interface initial selection protocol.

The port 1 control 42 sends the accepted device address and the ensuing channel command (either SYNCR or SYNCW) on to the master control unit 51. The port 1 control 42 also sends to the master control 51, a port identifier (ID) code which tells the master control 51 that it was port 1 that received this device address. The master control 51 then uses the device address to access the control table 52 to determine if this same device address has been received from any of the other processors. By program convention among the processors, only one other processor is allowed to use this same device address in the examples considered up to this point. (A modified example will be considered hereinafter.)

Assuming that this is the first time this particular device address has been received by the SCCA 30, then the control bits accessed from the control table 52 will be all zeros. If the received channel command was a SYNCR command, the master control 51 will then cause the "SYNCR received" bit at this address in the control table 52 to be set to a one value and the SYNCR port ID bits to be set to the particular code to identify the port at which this device address was received. If, on the other hand, the received channel command is a SYNCW command, then it is the "SYNCW received" bit which is set to one and the SYNCW port ID bits which are set to the port ID code. The master control 51 also instructs the port 1 control 42 to send back to processor A a CHANNEL END status message and a disconnect signal. This is done during the initial selection sequence in the port 1 control 42, that is, the initial selection status byte sent back to processor A includes this CHANNEL END status. This CHANNEL END status causes processor A to place the channel program for this device address in a suspended condition and the disconnect signal frees processor A to perform other work.

Assume now that at some later point in time a second processor, say processor B, sends this same device address to the SCCA 30. This address, the channel command accompanying same and the SCCA port ID code are passed to the master control 51, which then uses the device address to access the control table 52. The accessed control table bits are supplied to the master control 51, which then knows that this is the second occurrence of this device address and that such second occurrence was received by way of port 2. The master control then tells port 2 control 44 to send back to processor B both CHANNEL END and DEVICE END indications in the initial selection status byte. The master control 51 further tells the port 1 control 42 to send a DEVICE END status message to processor A. The master control 51 also tells the crosspoint switch unit 50 to prepare to interconnect the data bus from the port 1 control unit 42 to the data bus from the port 2 control unit 44 in anticipation of the receipt of the data transfer commands.

The receipt of the DEVICE END status by processor A reactivates the suspended channel program for this device address and causes it to command chain to the next CCW. At the same time, the receipt of the DEVICE END status by processor B causes the channel program therein for this same device address to command chain to the next CCW therein. By program convention, the next CCW in one of these processors contains a READ command and the next CCW for the other processor contains a WRITE command. Thus, the proper complementing commands are supplied by the two processors. These READ and WRITE commands cause the SCCA 30 to operate pretty much in the manner of the present System/370 channel-to-channel adapter, with the data being transferred from one port control unit to the other by way of the crosspoint switch 50.

At about the same time that the master control 51 instructs the port control units to send to their respective processors the DEVICE END status which initiated the command chaining to the READ and WRITE CCWs the master control 51 also operates to reset to zero the control bits in the control table 52 for this particular device address. After completion of the data transfer, the processor for which this device address is a READ address will, as soon as possible, issue to this address another START I/O instruction for reactivating the SYNCR+READ channel program for this device address. This serves to return this device address to a "synced for read" condition fairly quickly after completion of the data transfer.

Consider now the contention case for a particular processor-to-processor link and assume that the two device addresses for this particular link are in a "synced for read" condition. This means that in the control table 52, the SYNCR received bits for each of these addresses is turned on and that the SYNCR port ID's have been recorded for each of these addresses. The contention situation occurs when the processors both attempt to send messages at the same time by issuing START I/O instructions to their respective WRITE addresses for this link.

The SCCA 30 will commit itself to one of these device addresses. For the other device address, the master control 51 will turn on the SYNCW received bit in the control table 52 and will record in the SYNCW port ID location the ID code for the port which received this other address. The master control 51 will also instruct the port control unit for the uncommitted-to address to send back a CHANNEL END status and a disconnect signal to its processor. In other words, the SYNCW command for the uncommitted-to address is, in fact, accepted by the SCCA 30 but, instead of being acted upon, is, in effect, placed on a waiting list, this being accomplished by the turning on of the SYNCW received bit and recording the SYNCW port ID in the control table 42 for this address. At the same time that these SYNCW bits are recorded in the control table 52, a contention/busy latch is turned on in the master control 51. Now the operation for the committed-to address can proceed in the manner explained above.

After completion of the data transfer for the committed-to address, the SCCA 30 will note, by means of the contention/busy latch, that a previous contention case must now be handled. The master control 51 will then scan the SYNCW received bit column in the control table 52 to determine the device address and the two port ID's for the uncommitted-to device address which needs to be taken care of. The master control 51 then instructs the two thus identified port control units to send the identified address and a DEVICE END status to the processors connected to these two ports. The suspended channel programs in both of these processors will then be reactivated and the data transfer will take place for this previously uncommitted-to device address. The master control 51 also resets to zero the control table bits for this device address.

Consider now the "busy" case where the SCCA 30 is transferring data between two of the processors when a valid SCCA address and a sync command are received from a third processor. The sync command from this third processor is not rejected. It is accepted by the SCCA 30 and its occurrence is recorded in the control table 52. Its port control unit is instructed to send back a CHANNEL END status and a disconnect signal to place the channel program in the third processor in a suspended status and to disconnect the third processor from the SCCA 30.

If the sync command received from the third processor is, for example, a SYNCW command for that device address, then the SYNCW received bit is turned on and the port ID is recorded in the SYNCW port ID bit positions for that device address. If the SYNCR received bit is on and the SYNCR port ID is already present in the control table 52, then the contention/busy latch in the master control 51 is also turned on to mark the existence of a waiting address match up which needs to be handled. After completion of the data transfer in progress, the data transfer for this waiting address match up is handled.

A point to note is that the SCCA 30 never returns a busy status to any of the processors if an earlier commenced data transfer involving another device address is in progress. Instead, it records the pertinent particulars in the control table 52 and releases for other work the processor which issued the just received sync command. Thus, software overhead time is reduced.

A further point to note is that the SCCA 30 has no knowledge of the device address assignments, such as those in the tables of FIGS. 4 and 5, and does not need to know the identities of the processors. All the SCCA 30 is doing is matching device addresses. When an address match is detected, the master control 51 tells the crosspoint switch unit 50 to interconnect the two ports through which these matching addresses were received. If the crosspoint switch unit 50 should be busy with an in-progress data transfer, then the newly detected address match is identified as waiting and is taken care of after completion of the in-progress data transfer.

Up to this point, what has been described is the so-called "message sending" mode of operation wherein the different processors communicate with one another by sending messages back and forth. If desired, one or more of the processor-to-processor links may be operated in what might be called an inverted mode. In particular, it may sometimes be desirable that the processor at one end of a link be able to obtain data from a known storage location in the other processor without having to send a message to the other processor to ask for it. In this case, the two processors would be operated to normally maintain their ends of the link in a "synced for write" condition. Then the processor desiring to obtain the data would issue a START I/O instruction to its READ address to cause issuance of a SYNCR command. In this case, the connection would be made and the data would be transferred without the receiving processor first having to send a "request for data" message to the other processor. If the transfer is always going to be in the same direction, such as from processor A to processor B, then only one device address need be used for this purpose. The particular mode of operation, that is, whether "message sending" or inverted, is determined by the conventions agreed to in advance for the programs in the two processors.

Figure 8:
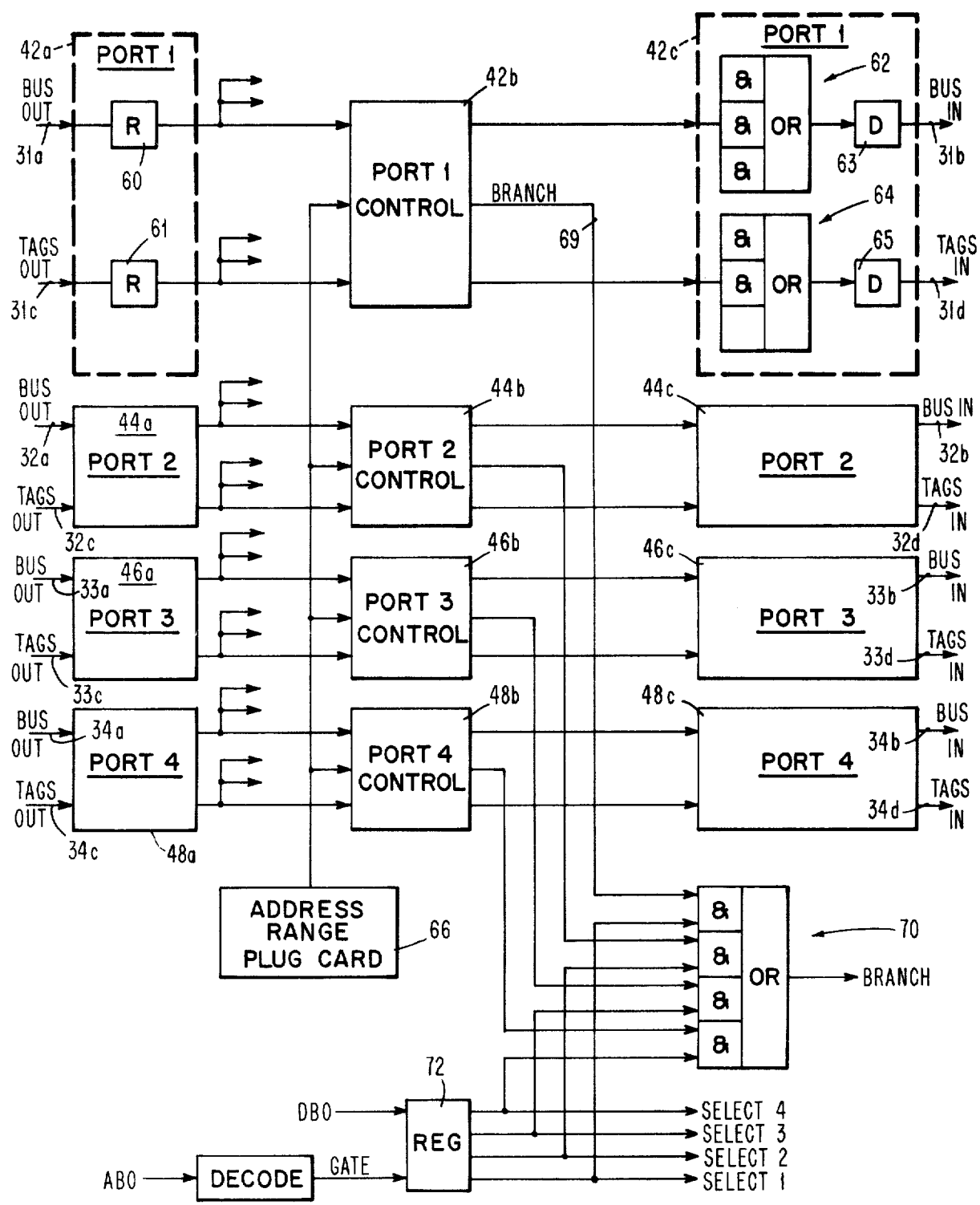
FIG. 8 shows in greater detail the construction of the port control portions of FIG. 6.

Referring now to FIG. 8, there is shown in greater detail a representative form of construction for the port control portion of FIG. 6. In FIG. 8, each of the interface cables 31-34 is represented in a subdivided manner to individually show the major conductor subgroups therein. Also, each of the port control units 42, 44, 46 and 48 is shown in a subdivided manner. Thus, for the interface cable 31 and the port control 42, the interface cable 31 is shown as being comprised of four multiconductor portions 31a, 31b, 31c and 31d and the port control 42 is shown as being comprised of portions 42a, 42b and 42c. The "in" and "out" nomenclature used in connection with the interface cable subgroups 31a-31d is taken with respect to the channel unit at the other end of the interface cable. Thus, for example, the term "Bus Out" denotes an interface conductor group which is used by the channel unit for sending out data. In a similar vein, the "Bus In" legend denotes an interface conductor group which is used to send data into the channel unit.

The port 1 portion 42a includes a first multibit receiver unit 60 for the Bus Out conductors 31a and a second multibit receiver unit 61 for the Tags Out conductor group 31c. The other Bus Out/Tags Out port control portions 44a, 46a and 48a for the other ports 2, 3 and 4, respectively, are of this same construction.

The port 1 portion 42c includes a multibit Bus In assembler 62 and a multibit driver unit 63 for the Bus In interface conductors 31b. Port 1 portion 42c also includes a Tags In assembler 64 and a multibit driver unit 65 for the Tags In interface conductors 31d. The port control portions 44c, 46c and 48c for the other ports 2, 3 and 4, respectively, are of this same construction.

An address range plug card 66 is connected to each of the port control portions 42b, 44b, 46b and 48b for indicating to each of the ports the complete set of device addresses which will be recognized by the SCCA 30. Each of port control portions 42b, 44b, 46b and 48b handles for its respective port the System/370 interface sequences that will require fairly immediate response. In particular, they will handle the initial portions of the initial selection sequences for the channel commands used in connection with data transfer operations.

Figure 9:
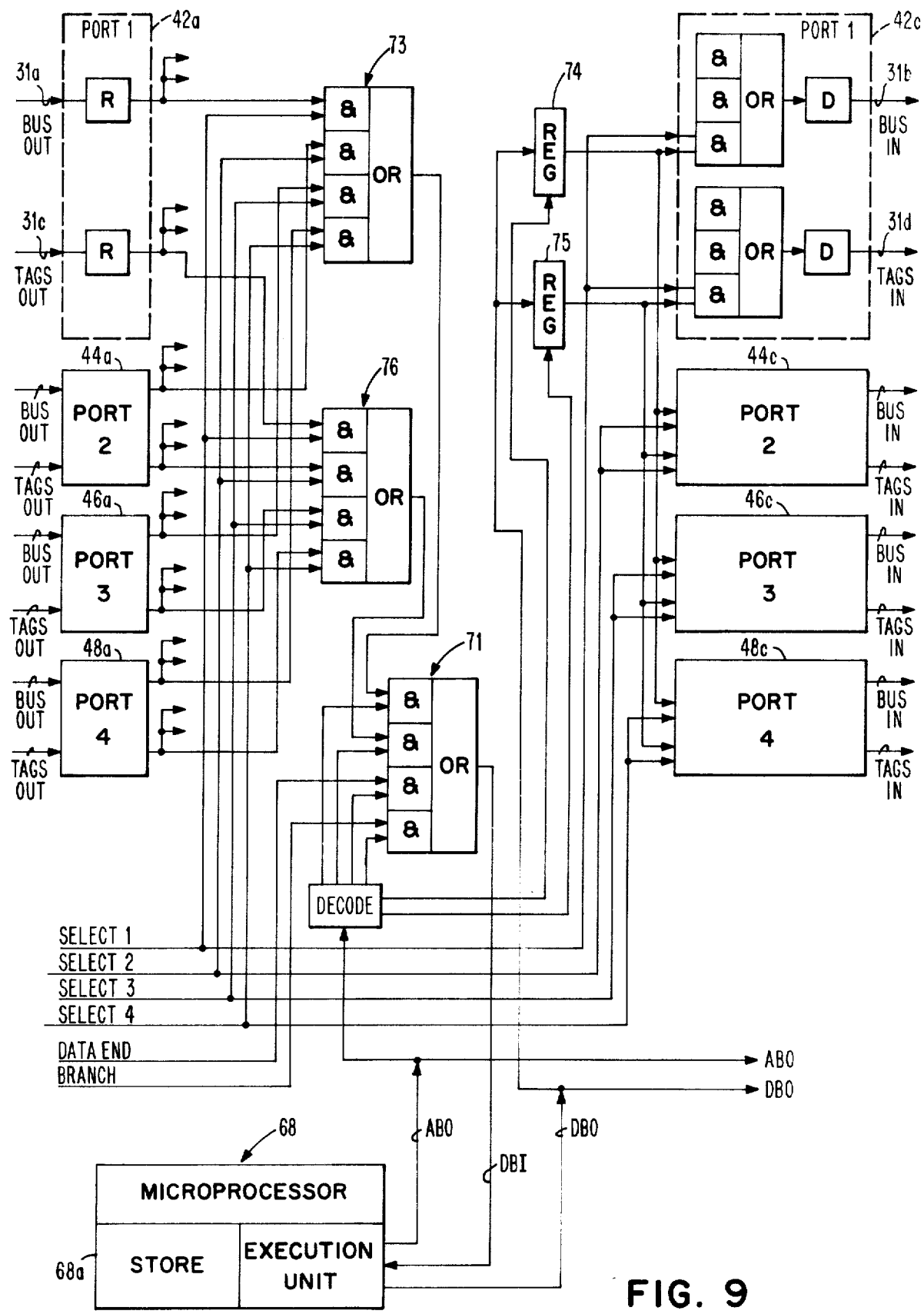
FIG. 9 shows in greater detail the construction of the master control portion of FIG. 6.

Referring to FIG. 9, there is shown in greater detail a representative form of construction for the master control and control table portions of the SCCA 30 of FIG. 6. With reference to FIG. 9, the major portion of the master control 51 is located in a microprocessor 68. The control table 52 is located in a storage section 68a of the microprocessor 68. Connected to an input port of the microprocessor 68 is a multibit Data Bus In (DBI) and connected to an output port is a multibit Data Bus Out (DBO). Connected to an address port of the microprocessor 68 is a multibit Address Bus Out (ABO). Among other things, the ABO and DBO buses run to the port control portions shown in FIG. 8.

A showing of the input and output port control portions 42a, 42c, 44a, 44c, etc., is repeated in FIG. 9 for cross-reference purposes.

As mentioned, the port controls 42b, 44b, 46b and 48b of FIG. 8 are used for initial selection sequence purposes. Considering, for example, the port control 42b for port 1, this port control 42b will note the initial selection transitions on the Tags Out lines 31c and will perform a hardware device address matching operation to match the device address then present on the Bus Out lines 31a with the valid addresses provided by plug card 66. If no match is detected, the select out tag is propagated to the next of any other I/O devices that may be attached to the interface cable 31. If an address match is detected, however, the port control 42b will respond to the processor A channel unit using the same device address as the detected match address. When the channel unit now responds by raising the command out tag line, port control 42b will pass control to the microprocessor 68 for further handling. The channel interface sequence waits until the microprocessor 68 takes control.

Port control 42b gets the microprocessor 68 to take control by placing a branch condition message on a bus 69 which runs to a branch condition assembler 70 which is, in turn, coupled to a microprocessor DBI assembler 71 (FIG. 9) which selects the data to be placed on the DBI bus of microprocessor 68.

Each of the other port controls 44b, 46b and 48b operates in this same manner. In particular, each operates to send a branch condition message to the assembler 70 when it detects an address match for a device address appearing on its associated Bus Out lines.

The normal activity of the microprocessor 68 is a continuous "round robin" polling of the port controls 42b, 44b, 46b and 48b. This is accomplished by setting the appropriate select values into a four-stage port control select register 72 (FIG. 8) in a sequential manner. The select values appear sequentially on DBO and each is set into the register 72 by a decode of the accompanying address on the ABO bus. The first select value (a 1000 field) sets the first register stage and resets the other register stages, the second select value (a 0100 field) sets the second register stage and resets the others, etc. This activates the four register output lines in a one-at-a-time manner and enables the assembler 70 to sequentially sample the branch condition buses of each of the port controls 42b, 44b, 46b and 48b and to transfer whatever appears thereon to the microprocessor 68 via assembler 71 and the DBI bus.

Microprocessor 68 monitors this input via the DBI bus to determine whether an address match has been detected. When a branch condition message is received indicating an address match, the microprocessor 68 temporarily branches to an initial selection routine. As part of this routine, the microprocessor 68 obtains the device address which produced the match from the appropriate port control (e.g., 42b) by way of its branch condition bus (e.g., 69) and assemblers 70 and 71. It will also read the channel command then appearing on the Bus Out lines of the interface cable which produced the address match (e.g., Bus Out lines 31a of cable 31). This is accomplished by way of a Bus Out assembler 73 and the DBI assembler 71.

The microprocessor 68 uses the device address to access the control table 52 residing in the storage section 68a. Microprocessor 68 examines the accessed control table bits and then sends the appropriate status message to the processor which produced the address match. This status message is sent to the appropriate processor by way of the DBO bus, a Bus In register 74 and the appropriate one of the output port control portions 42c, 44c, 46c and 48c. Also, the microprocessor 68 completes the initial selection sequence by providing the appropriate tag line signaling via DBO, a Tags In register 75 and the same one of the port control portions 42c, 44c, 46c and 48c used for the status message. In this connection, the Tags Out signals from this same interface cable are made available to the microprocessor 68 by way of a Tags Out assembler 76, the DBI assembler 71 and the DBI bus.

Figure 10:
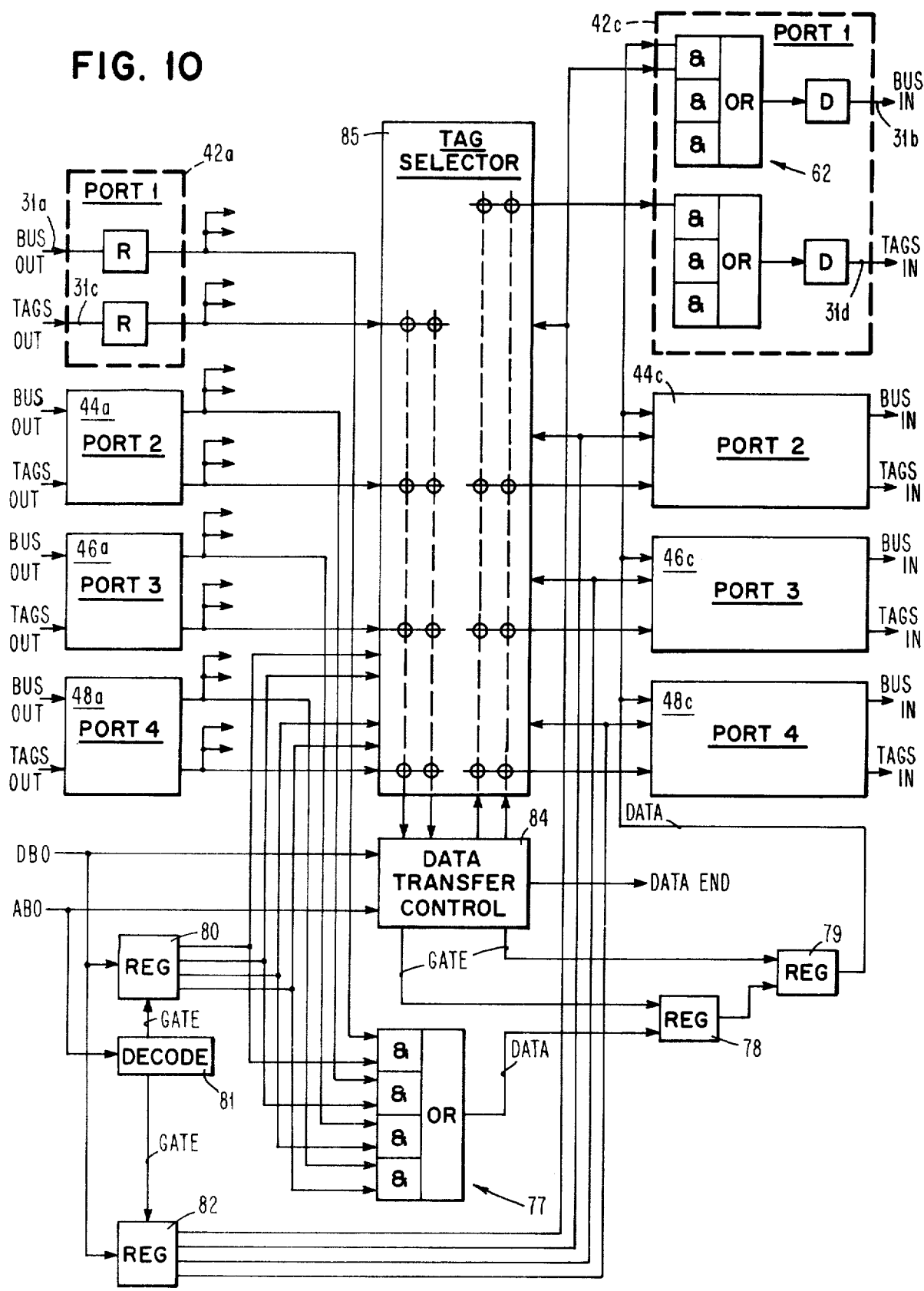
FIG. 10 shows in greater detail the construction of the crosspoint switch portion of FIG. 6.

Referring now to FIG. 10, there is shown in greater detail a representative form of construction for the crosspoint switch portion of FIG. 6. The showing of the input and output port control portions 42a, 42c, 44a, 44c, etc., previously shown in FIGS. 8 and 9, is repeated in FIG. 10 for cross-reference purposes. The remainder of FIG. 10 relates to the crosspoint switch unit 50 of FIG. 6.

With reference to FIG. 10, the crosspoint switch includes the appropriate hardware switch logic such that any port interface cable can be switched to any other port interface cable for data transfer purposes. This switch logic includes a data transfer data assembler 77 for selecting one of the four possible sets of Bus Out conductors (e.g., 31a) and connecting it to a first one-byte (nine-bit) data buffer register 78. The Bus Out conductor groups are, of course, used for transferring data from the processor channel units to the I/O devices connected to the interface cables, in this case to the SCCA 30. The data is passed from the first data register 78 to a second one-byte (nine-bit) data register 79 and from there to the Bus In assembler in a selected one of the output side port control portions 42c, 44c, 46c and 48c (for example, to Bus In assembler 62 in port control portion 42c). This places the data on the Bus In conductors for a selected one of the interface cables 31–34, namely, the cable which runs to the processor which is to receive the data.

The microprocessor 68 selects the appropriate port via which SCCA 30 is to receive data by setting the appropriate selection value into a four-stage input port selector register 80. The register 80 is selected by the address on ABO, the decode signal occurring at the output of decoder 81 serving to gate the selection value on DBO into the register 80. If port 1 is to be selected, the first stage in register 80 is set to one and the other stages are set to zero by the selection value on the DBO bus. Similarly, if port 2 is to be selected, the second register stage is set to one and the others to zero, and so on for the other ports. The output lines of register 80, in turn, control the data transfer assembler 77 to connect only the selected one of its input buses to its output bus.

In a similar manner, the microprocessor 68 selects the appropriate interface cable which is to receive the data to be outputted by the SCCA 30 by setting the proper selection value into an output port selector register 82. This energizes one and only one of the register 82 output lines to thereby enable the Bus In assembler in only the desired one of output port portions 42c, 44c, 46c and 48c.

The movement of each byte of data from the processor sending same to the data register 78 and then to the data register 79 and then to the processor receiving same is automatically controlled by a data transfer control unit 84. To this end, the data transfer control unit 84 also controls the in and out tag line groups for both processors involved in the data transfer to provide the necessary System/370 tag line handshaking protocol which accompanies the byte-by-byte movement of the data. To this end, a tag selector 85 connects to the data transfer control unit 84 the Tags In and Tags Out lines of the sending processor interface cable and also the Tags In and Tags Out lines of the receiving processor interface cable. The particular tag line groups which are selected and connected to the data transfer control 84 are determined by the same selection values which are set into the input port selector register 80 and the output port selector register 82 for selecting the desired bus line groups.

After the selecting and switching of the appropriate interface lines has been accomplished, the microprocessor 68 sends the appropriate starting information to the data transfer control 84 by way of the DBO bus. Thereafter, the data transfer control unit 84 takes over and automatically performs the necessary handshaking actions for moving the data. During this phase of the operation, the data transfer control unit 84 operates completely on its own and independently of the microprocessor 68. In this regard, the data transfer control unit 84 may be of the same hardware construction as the corresponding data moving portion of the present System/370 channel-to-channel adapter.

At the end of the data transfer phase, the data transfer control unit 84 sends a DATA END message to the microprocessor 68. The microprocessor 68 thereafter takes over control of the ports involved in the just-completed data transfer and performs the interface ending sequences for the processors connected to these ports.

During the data transfer phase, the data transfer control 84 is operating on its own independently of the microprocessor 68. During such data transfer phase, the microprocessor 68 returns to a polling and monitoring of the port controls for the ports which are not involved in the in-progress data transfer. In particular, the microprocessor 68 continues to test each of these other port controls for commencement of an initial selection sequence and if one is received, the microprocessor 68 provides the appropriate responses and records the appropriate information in the control table 52 in the manner previously described. The microprocessor 68 also, of course, periodically tests the data transfer control 84 (via DBI assembler 71) to see if it has a DATA END message.

Referring now to FIG. 11, there is described an alternate usage of the multiple processor SCCA wherein all processors in a group agree by convention that one device address implies data transfer to one specific processor in the group. As an example for the four-processor group of FIG. 3, it is agreed by convention that processor A will be the receiving processor and that each of the other processors B, C and D may send data to processor A by using the same device address, in this example, the device address 01. FIG. 11 shows the channel programs required in each of the four processors to accomplish this type of operation. In this case, processor A operates to place or return its channel program for device address 01 in a "synced for read" condition as soon as is practical. When any of the sender processors B, C and D wishes to send a message to processor A, it issues a START I/O instruction for device address 01 to cause issuance of a SYNCW command for address 01. Upon receipt of same, the SCCA 30 will connect the processor sending this SYNCW command for address 01 to the processor A in the manner previously described.

Since two or more of the sending processors B, C and D may issue a SYNCW command at about the same time, the control table in SCCA 30 will be modified to maintain a queue to enable the sending processors to be connected one at a time to processor A. It is also important to note that when processor A receives a message, the data message itself must contain information identifying which processor sent same. Otherwise, processor A will not know which one of the processors B, C and D sent the message.

FIG. 12 shows an example of a set of device address assignments that may be used for the mode of operation depicted in FIG. 11 for enabling any one of the four processors to send messages to any other one of the four processors. By comparing FIG. 12 with FIG. 4, it is seen that the FIG. 11 mode of operation can provide a fully symmetrical arrangement whereby any processor can talk to any other processor, which arrangement uses only four device addresses as compared to the twelve device addresses used in the FIG. 4 case. Thus, the FIG. 11 technique can be used to reduce the number of device addresses which are required. The FIG. 11 technique, however, has the trade off penalty that the data message itself must contain information identifying which processor is the sending processor. This, in turn, will require a bit more software overhead. Whether this trade off is advantageous will depend on the particular overall data processing application being considered.

In order to support the FIGS. 11-12 mode of operation, the control table 52 of FIG. 7 is extended to provide the control table 52x shown in FIG. 13. This extended control table 52x contains a queue of N depth for the SYNCW commands issued to each device address, where N denotes the number of sender processors. This queue is managed in first-in first-out (FIFO) order. The SYNCW commands placed in the queue are taken up for data transfer execution in the strict order in which they are received by the SCCA 30.

The hardware of FIGS. 8-10 can also be used to provide this FIGS. 11-12 mode of operation. No change in hardware is required. The size of the control table in the microprocessor storage area 68a (FIG. 9) is, of course, increased in the manner indicated in FIG. 13. Also, additional microcode steps are added to the control program in the microprocessor 68 for purposes of managing the extended control table 52x.

From the foregoing description of the representative multiple processor embodiment, it is seen that an SCCA may be constructed in accordance with the present invention for interconnecting more than two data processors. The example considered above was for the case of four processors. It should be clearly understood, however, that the invention is not limited to the case of four processors. Using the same principles as described above, an SCCA in accordance with the present invention may be constructed to interconnect three or five or six or more processors.

Also, it is not necessary that all of the ports of any given multiple processor SCCA be connected for use in any given multiple processor system. For example, the SCCA may be constructed to have six ports for interconnecting six processors. Nevertheless, one or more of the ports may remain disconnected and not be used in a particular overall system. For example, a six port SCCA may also be used to interconnect only five processors or four processors or three processors or even only two processors.

One further point that should be noted is that the present invention is not limited to the above-described form of construction wherein the SCCA makes use of a microprocessor. The control functions provided by the microprocessor may, for example, instead be provided by the appropriate hardwired control circuitry.

While there have been described what are at present considered to be preferred embodiments of this invention, it will be obvious to those skilled in the art that various changes and modifications may be made therein without departing from the invention, and it is, therefore intended to cover all such changes and modifications as fall within the true spirit and scope of the invention.

What is claimed is:

1. A channel-to-channel adapter for interconnecting data processors, said adapter comprising:
    a plurality of ports, each of which is adapted to be coupled to an input/output channel of a different one of a plurality of data processors;
    data transfer circuitry for selectively providing different data transfer interconnections between the ports;
    a plurality of port control mechanisms individually coupled to the different ones of the ports and each including circuitry for detecting the receipt of any one of a plurality of predetermined input/output device addresses, received from a program being run on the input/output channel of a connected one of said plurality of data processors;
    and control circuitry coupled to the port control mechanisms and responsive to the predetermined device addresses received at the ports for enabling the data transfer circuitry to provide a data transfer interconnection following receipt of a predetermined device address at two of the ports and to provide another data transfer interconnection following receipt of each additional predetermined device address at two of the ports.

2. A channel-to-channel adapter in accordance with claim 1 wherein the control circuitry is:
    responsive to the receipt of a first predetermined device address at each of a first and second port for initiating a transfer of data from the first port to the second port;
    and responsive to the receipt of a second predetermined device address at each of the first and second ports for initiating a transfer of data in the opposite direction, namely, from the second port to the first port.

3. A channel-to-channel adapter in accordance with claim 1 wherein the control circuitry includes:

circuitry for storing indications of the predetermined device addresses received by each port;

and circuitry operative after initiation of a data transfer for resetting the indications stored for the device address involved in the data transfer.

4. A channel-to-channel adapter in accordance with claim 3, wherein the control circuitry includes:

circuitry coupled to the indication storing circuitry and responsive to the receipt of one of the predetermined device addresses for determining whether the same device address has been received by and is pending for another port;

and circuitry operative when the determination is affirmative for applying to each of the ports involved in the address match status messages for causing the channels coupled thereto to proceed with their data transfer operations for such device address.

5. A channel-to-channel adapter in accordance with claim 4, wherein the control circuitry includes:

circuitry operative when the determination is negative for applying to the port which received the predetermined device address a status message for causing the channel coupled thereto to temporarily suspend the data transfer operation for such device address.

6. A channel-to-channel adapter in accordance with claim 5 wherein:

the ports are adapted to be coupled to channels of the block multiplexer type;

one of the channels involved in the address match determination includes for the device address in question a channel program which includes a sync command channel word command chained to a read command channel word;

the other of the channels involved in the address match determination includes for the device address in question a channel program which includes a sync command channel word command chained to a write command channel word;

the circuitry operative when the address match determination is negative operates to apply to the port which received the device address a channel end status and a disconnect signal for temporarily suspending the channel program and disconnecting the channel from the channel-to-channel adapter;

and the circuitry operative when the address match determination is affirmative operates to apply to the two ports involved in the address match a device end status message for reactivating the suspended channel program and causing the two channel programs to command chain to their respective ones of the read and write command channel words, whereupon the transfer of data from the channel issuing the write command to the channel issuing the read command is commenced.

7. A channel-to-channel adapter for interconnecting more than two data processors, said adapter comprising:

multiple ports, each of which is adapted to be coupled to an input/output channel of a different one of more than two data processors;

a crosspoint switch mechanism for selectively providing data transfer interconnections between any two of the ports;

multiple port control mechanisms individually coupled to the different ones of the ports for detecting the receipt of predetermined input/output device addresses issued by the channels, received from a program being run on the input/output channel of a connected one of said plurality of data processors;

and control circuitry coupled to the port control mechanisms and responsive to the receipt of any given predetermined device address at two different ports for enabling the crosspoint switch mechanism to provide a data transfer interconnection between the two ports at which the matching device addresses were received.

8. A channel-to-channel adapter in accordance with claim 7 wherein the given device address infers a particular direction of data transfer between two processors by program convention and the control circuitry is responsive to the given device address for initiating the transfer of data in such particular direction.

9. A channel-to-channel adapter in accordance with claim 7 wherein each port control mechanism is capable of detecting the same predetermined device addresses and the number of device addresses detectable by each port control mechanism is at least equal to the number of channel-to-channel adapter ports which are connected for use.

10. A channel-to-channel adapter in accordance with claim 7 wherein each port control mechanism is capable of detecting at least two different device addresses for each processor other than the one to which it is coupled, one such device address for each pair of processors by program convention serving to identify a first direction of data transfer therebetween and the other such device address serving to identify the opposite direction of data transfer therebetween.

11. A channel-to-channel adapter in accordance with claim 7 wherein the control circuitry includes:

a storage mechanism having a different storage location for each of the predetermined device addresses;

and circuitry responsive to the occurrence of each predetermined device address for storing in the correspondng storage location information identifying the port at which it was received.

12. A channel-to-channel adapter in accordance with claim 11 wherein the control circuitry includes:

circuitry coupled to the storage mechanism and responsive to the receipt of a predetermined device address for determining whether the same device address has been received by and is pending for another port;

and circuitry operative when the determination is affirmative for enabling the crosspoint switch mechanism to provide a data transfer interconnection between the two ports at which the predetermined device address was received.

* * * * *